US010731397B2

(12) United States Patent
Tsui et al.

(10) Patent No.: US 10,731,397 B2
(45) Date of Patent: Aug. 4, 2020

(54) BARRIER CONTROL SYSTEM WITH AUXILIARY POWER SUPPLY AND AUXILIARY POWER SUPPLY FOR BARRIER CONTROL SYSTEM

(71) Applicants: Philip Y. W. Tsui, Fo Tan (HK); Gallen K. L. Tsui, Brampton (CA)

(72) Inventors: Philip Y. W. Tsui, Fo Tan (HK); Gallen K. L. Tsui, Brampton (CA)

( * ) Notice: Subject to any disclaimer, the term of this patent is extended or adjusted under 35 U.S.C. 154(b) by 0 days.

(21) Appl. No.: 15/791,611

(22) Filed: Oct. 24, 2017

(65) Prior Publication Data

US 2018/0044967 A1 Feb. 15, 2018

Related U.S. Application Data

(63) Continuation of application No. 14/066,325, filed on Oct. 29, 2013, now abandoned.

(60) Provisional application No. 61/719,539, filed on Oct. 29, 2012.

(51) Int. Cl.

| | |
|---|---|
| ***H02J 9/00*** | (2006.01) |
| ***E05F 15/681*** | (2015.01) |
| *E05F 15/668* | (2015.01) |
| *E05F 15/43* | (2015.01) |
| *G07C 9/00* | (2020.01) |

(52) U.S. Cl.

CPC .......... *E05F 15/681* (2015.01); *E05F 15/668* (2015.01); *E05F 2015/435* (2015.01); *E05Y 2400/45* (2013.01); *E05Y 2400/502* (2013.01); *E05Y 2400/612* (2013.01); *E05Y 2800/252* (2013.01); *E05Y 2900/106* (2013.01); *G07C 2009/00928* (2013.01); *Y10T 307/344* (2015.04)

(58) Field of Classification Search

CPC .............. E05F 15/681; E05F 2015/435; Y10T 307/344; G07C 2009/00928; E05Y 2800/252; E05Y 2400/612; E05Y 2400/45; E05Y 2900/106; E05Y 2400/502

USPC .................................. 307/326, 66; 318/280

See application file for complete search history.

(56) References Cited

U.S. PATENT DOCUMENTS

| | | | | |
|---|---|---|---|---|
| 6,164,788 A * | 12/2000 | Gemmell | .................. | F21S 8/02 362/20 |
| 8,519,566 B2 * | 8/2013 | Recker | ............... | H05B 37/0272 307/64 |
| 2003/0178957 A1 * | 9/2003 | Fitzgibbon | ................ | H02P 1/44 318/280 |
| 2006/0267409 A1 * | 11/2006 | Mullet | .................. | E05F 15/00 307/64 |
| 2008/0184622 A1 * | 8/2008 | Mullet | .................... | E05F 15/00 49/26 |

(Continued)

*Primary Examiner* — Jared Fureman
*Assistant Examiner* — Emmanuel Dominique

(57) ABSTRACT

The invention relates generally to the field of barrier control systems and in particular relates to barrier control systems, such as a garage door opener, with auxiliary power supply and auxiliary power supply for barrier control systems. A barrier control system, such as a garage door opener, with an auxiliary power supply and an auxiliary power supply for a barrier control system are described. The auxiliary power supply includes a backup battery and a light source that is operable on DC power. The auxiliary power supply includes a sensor to detect whether a DC motor of the barrier control system is powered by the backup battery, and switches on the light source upon detecting the DC motor being powered by the backup battery.

11 Claims, 4 Drawing Sheets

(56) References Cited

U.S. PATENT DOCUMENTS

| | | | | |
|---|---|---|---|---|
| 2009/0195162 | A1* | 8/2009 | Maurer | H05B 47/19 315/87 |
| 2010/0141153 | A1* | 6/2010 | Recker | H05B 33/0803 315/149 |
| 2010/0156182 | A1* | 6/2010 | Mertel | E05F 15/668 307/66 |
| 2013/0086841 | A1* | 4/2013 | Luper | E05F 15/0026 49/28 |

* cited by examiner

BARRIER CONTROL SYSTEM WITH AUXILIARY POWER SUPPLY AND AUXILIARY POWER SUPPLY FOR BARRIER CONTROL SYSTEM

CROSS-REFERENCE TO RELATED APPLICATION

This application is a continuation of U.S. patent application Ser. No. 14/066,325, filed Oct. 30, 2013, and claims priority from U.S. Provisional Patent Application Ser. No. 61/719,539, filed on Oct. 29, 2012, which content is incorporated herein by reference in its entirety.

FIELD OF INVENTION

The present invention relates generally to the field of barrier control systems and in particular relates to barrier control systems, such as a garage door opener, with auxiliary power supply and auxiliary power supply for barrier control systems.

BACKGROUND OF INVENTION

Barrier control systems, such as a garage door opener, generally operate on alternating current ("AC") power. During power failure of AC power, a user would not be able to operate a barrier control system. This could inconvenience a user, especially if the barrier control system is a garage door opener, because the user would not be able to enter or exit a garage. Auxiliary power supply equipped with a backup battery for garage door opener has been available for quite some time, which provides the advantage of being able to operate the garage door opener during power failure. However, these auxiliary power supplies available on the market tend to provide power only to open and close garage door. Generally, the backup battery delivers direct current ("DC") voltage to a motor, which operates on DC power. However, another major functional aspect of a garage door opener, i.e., illuminating the interior of a garage, generally requires AC power to light up a light bulb that is built into a garage door opener unit. Such a backup battery, which provides only DC power, therefore cannot directly power such an AC light bulb. Therefore, during power failure, the garage door can be opened and closed if the garage door opener is equipped with such an auxiliary power supply, but there still will be no light.

To power the light bulb that is built into a garage door opener unit, it requires AC power. A backup battery provides only DC power. Therefore it would be necessary to provide additional control elements in a circuitry to convert the DC power output from a battery to AC current in order to power up the built-in light bulb. In addition, as the DC motor and the AC light bulb require different power sources, the auxiliary power supply would have to supply AC power and DC power separately to the light bulb and the DC motor, which tends to further increase the complexity and costs of such an auxiliary power supply or garage door opener.

Therefore, there is a need to have an auxiliary power supply solution so that the light can be turned on during power failure when operating the barrier control system. The forgoing creates challenges and constraints in providing such a barrier control system. It is an object of the present invention to mitigate or obviate at least one of the above mentioned disadvantages.

SUMMARY OF INVENTION

The present invention is directed to barrier control systems, such as a garage door opener, with auxiliary power supply, and directed to auxiliary power supply for barrier control systems. In general terms, an auxiliary power supply includes a backup battery that can be connected to a barrier control system externally or integrated with a barrier control system. A pair of wires connects the backup battery to the opener main unit. Under normal operating conditions, the garage door opener unit is powered by external AC power source and, at the same time, the garage door opener unit charges the backup battery through the wires connecting the battery and the opener unit. When external AC power experiences a power failure, the backup battery will provide power to move a movable barrier, such as to open and close a garage door, at the same time, the backup battery also powers a separate light source, which may be one or more light emitting diodes (or LEDs), to illuminate the interior of the garage. A control circuitry can also include a timer such as a countdown timer so the light source is switched on only for a pre-set period of time.

In one aspect of the invention, there is provided a barrier control system for controlling operation of a barrier movement mechanism. The barrier control system comprises a microprocessor, a DC motor for driving the barrier movement mechanism, a light source that can draw DC current directly, an AC-DC converter unit for converting AC power supply to DC power output to power the DC motor, and an auxiliary power supply. The microprocessor receives user command for operating the barrier movement mechanism and controls the energizing of the DC motor, which is powered by the DC power output. The auxiliary power supply is configured to automatically supply backup power to the microprocessor, the light source and the DC motor during power failure of the AC power supply. The auxiliary power supply comprises a backup battery for supplying the backup power, and a sensor to detect the DC motor being powered by the backup battery. The microprocessor is further configured to cause the auxiliary power supply to energize the light source for a pre-selected duration upon detection of the DC motor being powered by the backup battery.

In another aspect of the invention, there is provided an auxiliary power supply for a barrier control system. The barrier control system operates on AC power to control operation of a barrier movement mechanism. The barrier control system has a microprocessor, a DC motor controlled by the microprocessor for driving the barrier movement mechanism, and an AC-DC converter unit for converting AC power supply to DC power output to power the DC motor. The auxiliary power supply comprises a backup battery for powering the microprocessor and the DC motor during power failure of the AC power, a second microprocessor powered by the backup battery, and a sensor to detect the DC motor being powered by the backup battery. The second microprocessor is configured to switch on a light source that draws DC current from the backup battery for a pre-selected duration upon detection of the DC motor being powered by the backup battery.

In yet another aspect of the invention, there is provided a barrier control system for controlling operation of a barrier movement mechanism. The barrier control system comprises a microprocessor, a DC motor for driving the barrier movement mechanism, energizing of the DC motor being controlled by the microprocessor, a light source that can draw DC current directly, an AC-DC converter unit for converting AC power supply to DC power output, the DC motor being powered by said DC power output, and an auxiliary power supply. The auxiliary power supply is configured to supply backup power to the microprocessor, the light source and the DC motor during power failure of said AC power supply and comprises a backup battery for supplying the backup power, and a sensor to detect barrier movement. The microprocessor receives user command for operating the barrier movement mechanism and is configured to cause the auxiliary power supply to energize the light source for a pre-selected duration upon detection of the barrier movement.

In other aspects the invention provides various combinations and subsets of the aspects described above.

BRIEF DESCRIPTION OF DRAWINGS

For the purposes of description, but not of limitation, the foregoing and other aspects of the invention are explained in greater detail by way of examples with reference to the accompanying drawings, in which.

DETAILED DESCRIPTION

Figure 1:
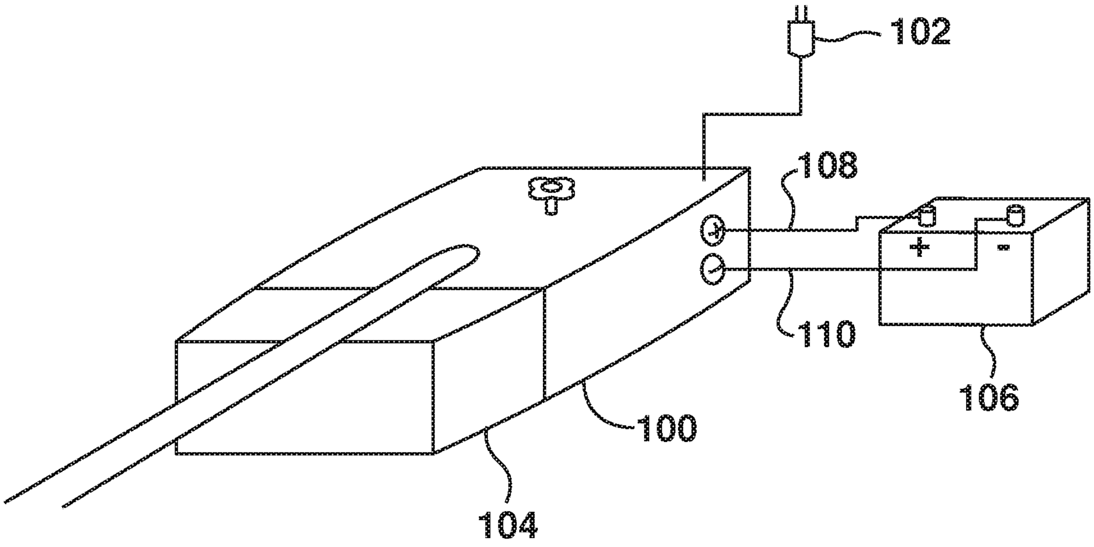
FIG. 1 (Prior Art)
FIG. 1 shows a prior art garage door opener with an internal backup battery unit.

The description which follows and any embodiment described therein are provided by way of illustration of an example, or examples, of particular embodiment or embodiments of the principles of the present invention. These examples are provided for the purposes of explanation, and not limitation, of those principles and of the invention. In the description which follows, like parts are marked throughout the specification and the drawings with the same respective reference numerals.

FIG. 1 shows a typical (prior art) garage door opener 100 with an internal backup battery unit. Garage door opener unit 100 is plugged into an external power outlet with a power cord 102. Inside light cover 104 of garage door opener unit 100 is installed a light source, such as a light bulb. Under normal operation, the opener unit operates by AC power. A backup battery 106 (normally installed inside cover 104 but shown in FIG. 1 outside light cover 104 for better illustration) can be connected to the opener unit by a pair of wires, 108 and 110, connecting the positive and negative terminals from the battery to the DC power terminals inside the opener unit. During normal operation, power is transmitted through the wires 108 and 110 to charge the backup battery. During power failure, backup battery will deliver an alternative DC power to the opener unit, replacing the DC power of the opener unit. The only light source in this setup is the light bulb inside the light cover. During power failure, the backup battery provides power only to the DC motor. As no AC power is provided to the light bulb, there will be no light during the opening or closing of the garage door.

Figure 2:
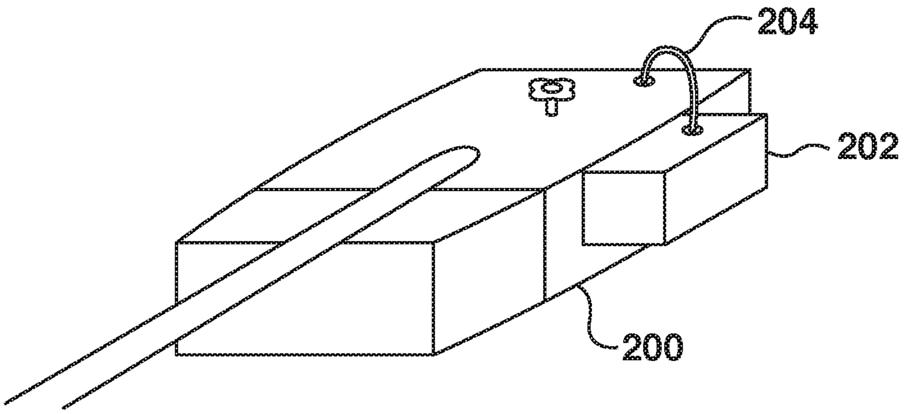
FIG. 2 (Prior Art)
FIG. 2 shows a prior art garage door opener with external backup battery unit.

FIG. 2 shows a (prior art) garage door opener with an external backup battery unit. A backup battery unit 202 is connected to the garage door opener 200 with a wire harness 204, which includes a pair of wires, one being positive and one being negative, to provide electric connections between the battery inside backup battery unit 202 and a DC power output inside the opener. Wire harness 204 delivers DC power from the battery to the opener unit during power failure, as well as power from the opener to the battery for charging the battery during normal operation.

Figure 3:
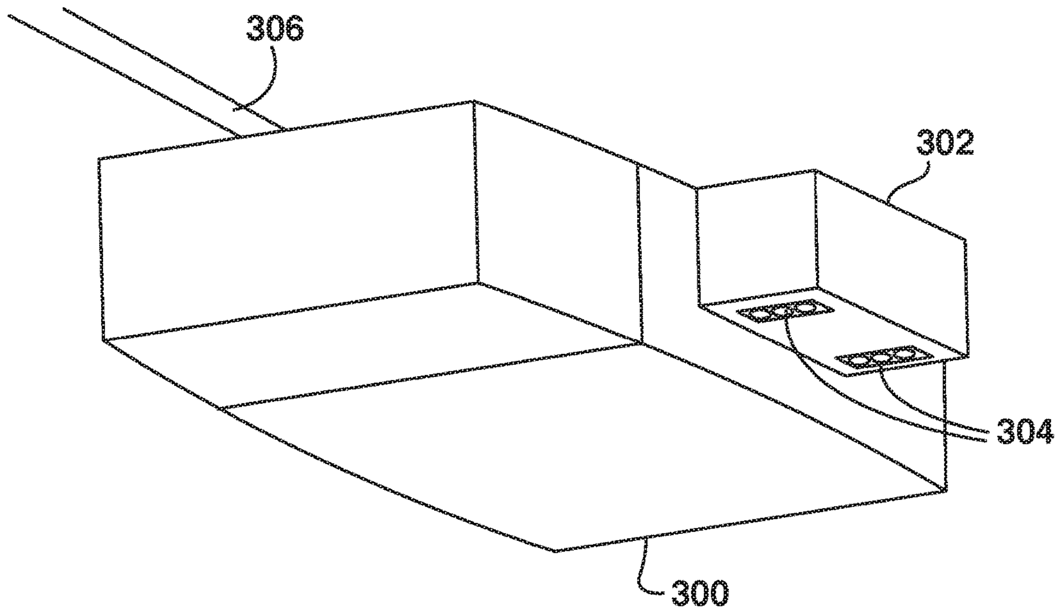
FIG. 3 shows an auxiliary power supply unit attached to a barrier control system.

FIG. 3 shows an auxiliary power supply unit 302 attached to a barrier control system, such as garage door opener 300. Auxiliary power supply unit 302 has an enclosure cover, which may be a plastic or metal enclosure, and is mounted next to the garage door opener unit 300. Inside the enclosure cover is installed a backup battery unit (not shown). Light source 304 is mounted at a location, such as the bottom of the backup battery unit, so that the light source can provide suitable illumination of the garage interior. Light source can be one or more light emitting diodes ("LEDs"), or any other suitable light sources that can draw DC current directly from a backup battery. Barrier movement mechanism 306, which may comprise chains or belt and a power transmission unit, delivers the power from the motor to move a movable barrier, e.g., to open or close a garage door. The light source is switched on for a fixed, pre-set period of time (e.g., a pre-selected duration such as three minutes) when the garage door opener is activated and powered by the backup battery inside auxiliary power supply unit 302; alternatively or in addition, switching-on of the light source is separately controllable, e.g., it may be turned on with a specific user command transmitted from a hand held control unit (not shown) or entered at a wall mounted control unit (not shown).

Figure 4:
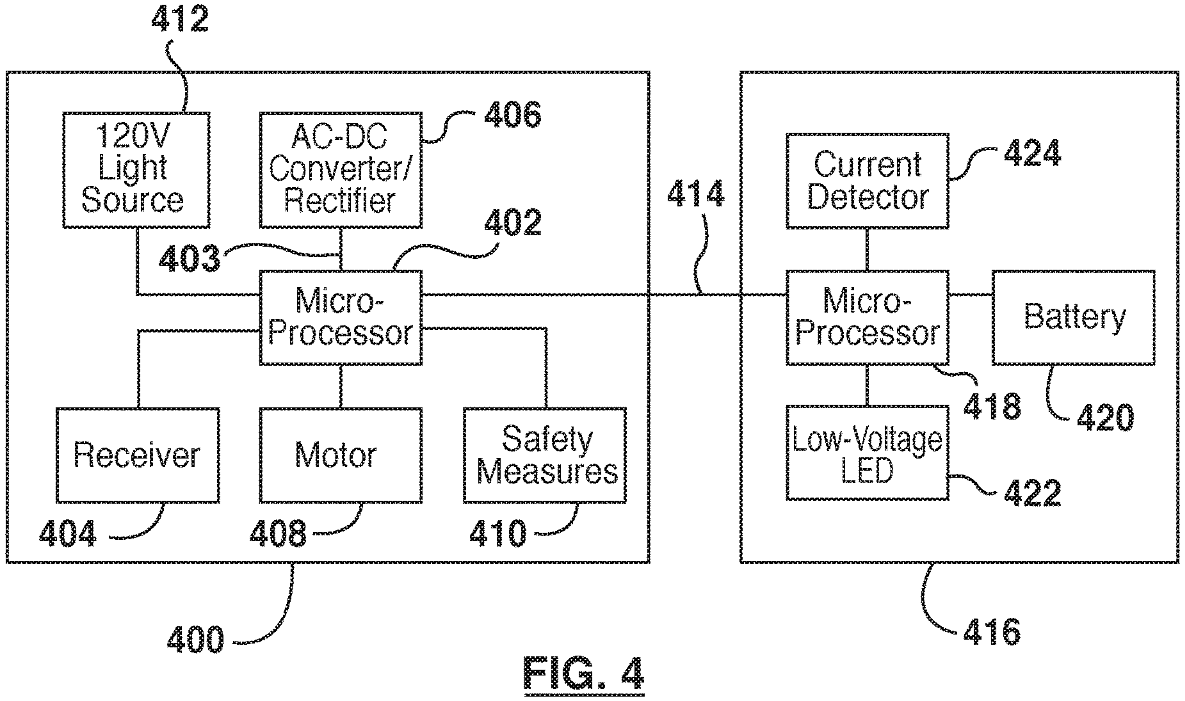
FIG. 4 is a block diagram illustrating functional components of a barrier control system with an auxiliary power supply unit as shown in FIG. 3.

FIG. 4 is a block diagram illustrating functional components of a barrier control system with an auxiliary power supply unit as shown in FIG. 3. Barrier control system 400 may be a garage door opener unit, and is powered by external AC power. Garage door opener unit 400 includes a microprocessor 402. Microprocessor 402 controls all logics such as receiving wireless signals from a receiver 404, decoding such wireless signal to verify whether the received signal is from an authorized hand held control device, and executing user commands received. AC-DC converter unit 406, or rectifier, converts AC power supplied by external AC power to a DC power output 403 to power the DC components of the garage door opener unit. The microprocessor is configured, i.e., programmed, to verify that the received wireless signal is a valid signal. When the signal is verified to be valid, the microprocessor is configured to decode the signal and execute the command carried by the signal. For example, when a command to open or close the garage door is received, the microprocessor is configured to connect the DC power output 403 of AC-DC converter unit 406 to a DC motor 408 to energize the motor, thus, drive the barrier movement mechanism 306 to open or close the movable barrier, such as a garage door. Safety measures 410 such as infrared beam sensor (for detecting door movement) or entrapment protection system (for inhibiting movement of door in unsafe conditions) will be energized to ensure the door operates safely. A light source powered by external 120V AC power, such as 120V AC light source 412, may also be turned on for a fixed duration to provide illumination inside the garage.

Electric path 414, which may be electric wires, connects the garage door opener unit 400 and auxiliary power supply unit 416 together. In the example illustrated in FIG. 4, auxiliary power supply unit is a unit separate from the garage door opener 400. In another example, the auxiliary power supply unit can be integrated with the garage door opener unit, as will be explained later. When the auxiliary power supply unit 416 is a separate unit, it includes a second microprocessor 418, which may be connected to and communicate with the microprocessor 402 (the first microprocessor) of the garage door opener unit 402.

More specifically, electric path 414 of the example shown in FIG. 4 connects backup battery 420 of the auxiliary power supply unit to the DC power output of the AC-DC converter unit 406 (shown as through and switched by the microprocessors 402, 418, but not necessary). The backup battery may be any suitable rechargeable battery, such as a NiMH or a lead acid rechargeable battery. During normal operation, this path conveniently provides DC power from the garage door opener unit to charge the backup battery 420, so as to keep it fully charged. During power failure of external AC power, path 414 delivers DC power from the backup battery to DC components in the garage door opener unit 400 to maintain their normal operation.

However, the DC power of the backup battery 420 generally is not able to power the 120V AC light bulb 412. To provide illumination during power failure of external AC power, a separate light source 422 is provided. The additional light source may be one or more low voltage LEDs. Although in FIG. 4, the additional light source 422 is shown to be built into auxiliary power supply unit 416, it is understood that the light source 422 is not required to be part of the auxiliary power supply. It only needs to be able to draw DC current directly from the auxiliary power supply and that its switch on or off can be controlled by a suitable microprocessor (microprocessor 418 in this example). A sensor is provided to detect whether the DC motor 408 is powered by the backup battery 420 flowing through the DC motor. For example, a current detection circuitry 424 may be used to detect output DC current from backup battery 420. Alternatively, a movement detector, such as the safety detection device or sensor 410, may also be employed to detect barrier movement. During AC power failure, the backup battery will provide DC power to the garage door opener unit through the path 414. There will be significant DC current drawn from the auxiliary power supply unit. When the output DC current exceeds a threshold value, generally a value required to energize the DC motor 408, the garage door opener unit is in operation and powered by the backup battery. Upon detection of this condition or simply the detection of barrier movement, the second microprocessor 418 is configured to switch on the other light source 422, while the DC motor is powered by the backup battery and the garage door is in movement. In addition, the auxiliary power supply unit may also include a timer, which can be conveniently built into the second microprocessor 418. The second microprocessor 418 will start the timer, which may be a countdown timer, to turn the light off after a specific period of time, such as 3 minutes.

Figure 5:
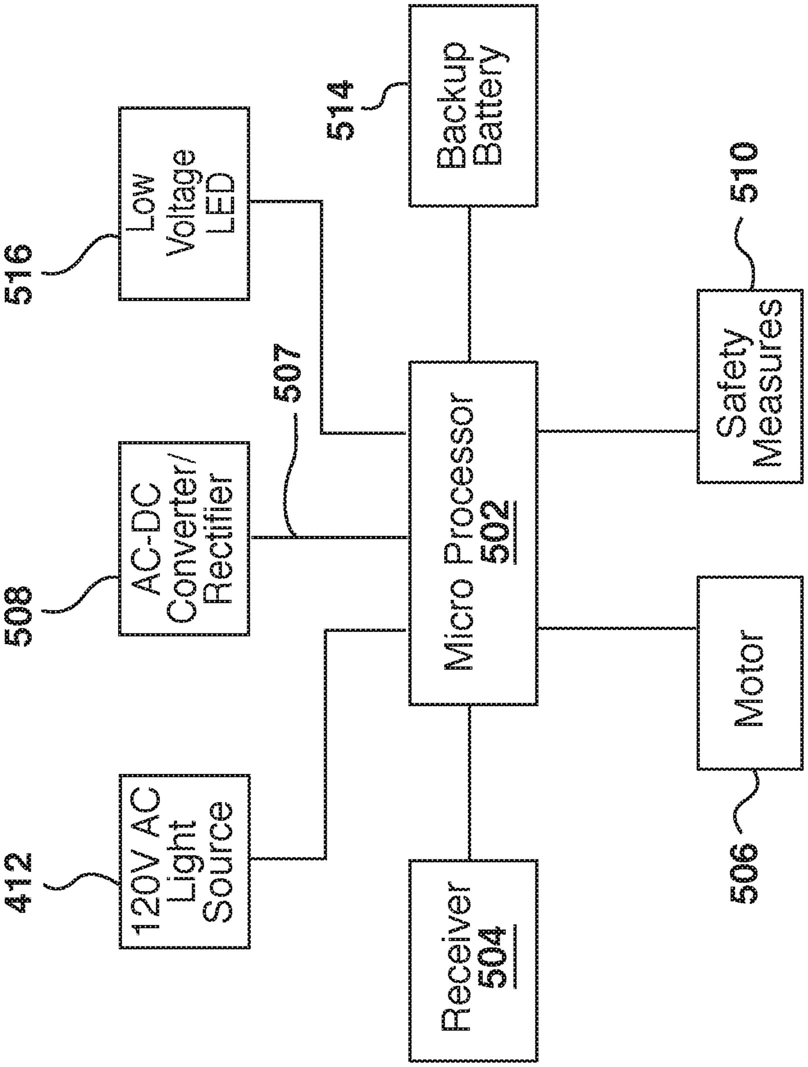
FIG. 5 is a block diagram illustrating functional components of a barrier control system with built-in auxiliary power supply.

FIG. 5 is a block diagram illustrating functional components of an example of a barrier control system similar to that shown in FIG. 4, but with an auxiliary power supply unit integrated with the garage door opener system, in one enclosure. In other words, the components of the garage door opener unit 400 of FIG. 4 and the auxiliary power supply unit are enclosed in or mounted to the same housing. Because the auxiliary power supply unit is integrated into the barrier control system, only one microprocessor 502 is needed. Microprocessor 502 receives wireless signals from receiver 504, decodes and verifies the signal, executes the command carried by, i.e., encoded in the signal, and controls all other logics in the same way as the first microprocessor 402 shown in FIG. 4. For example, microprocessor 502 controls energizing of motor 506 by the DC power output 507 from an AC-DC converter 508, processing of sensor signals from safety measures 510, and switching on and off of 120V AC light source 508. In addition, microprocessor 502 also controls energizing of a light source by connecting it directly to DC power output from the built-in auxiliary power supply unit. Backup battery 514 is shown to be electrically connected to the AC-DC converter 508 through microprocessor 502 in this example, though it is understood that it may be electrically connected to the AC-DC converter 508 directly, in particular, connected directly to its DC power output. As in the example illustrated in FIG. 4, this connection allows the AC-DC converter 508 to charge the backup battery 514 during normal operation. During power failure of external AC power, backup battery 514 provides DC power to components in the integrated garage door opener unit to maintain their normal operation. However, similar to the example shown in FIG. 4, backup battery 514 is not able to turn on the 120V AC light bulb 512. As in the example shown in FIG. 4, a separate light source 516, which may comprise one or more low voltage LEDs, is provided. As such a light source draws DC current, backup battery 514 can energize the light source 516 directly. The microprocessor 502 may be configured to detect AC power failure, and upon its detection, will turn on the low voltage LEDs when connecting the motor 506 to the backup battery 514 during such failure. Of course, a current detection circuitry (not shown) may still be provided to sense the DC current supplied by the backup battery 514 to the DC motor 506, and the current exceeding a threshold value may still be a triggering signal to the microprocessor for it to switch on the low voltage LED for the pre-selected duration, such as three minutes. Alternatively or in addition, switch on of the light source 516 may be triggered by detection of barrier movement through a motion detector, such as an infrared beam sensor (not shown in FIG. 5).

Figure 6:
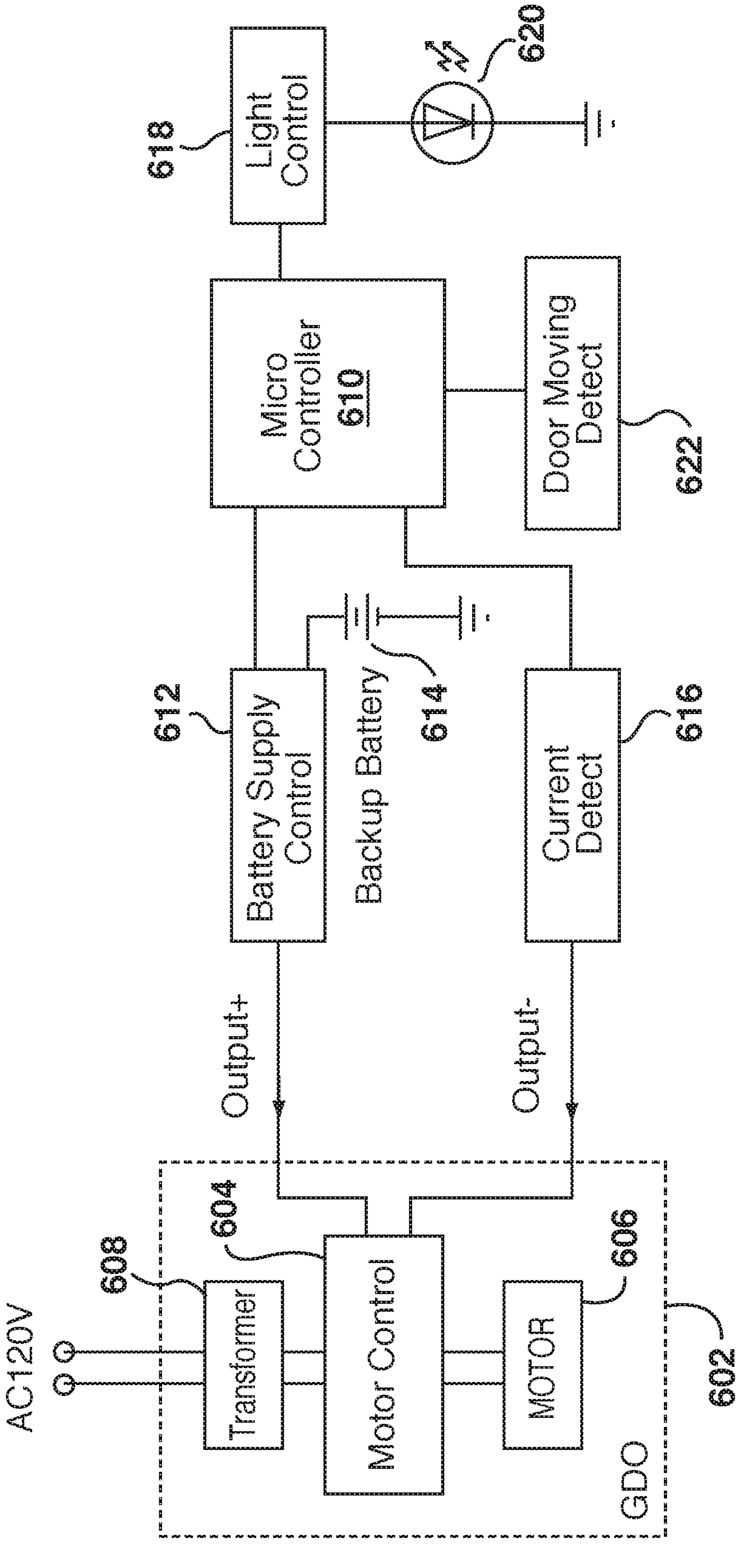
FIG. 6 is a block diagram illustrating functional components of an example of a garage door opener control system with an auxiliary power supply.

FIG. 6 shows in block diagram an example of a garage door opener (GDO) control system with an auxiliary power supply. Its GDO unit 602 includes motor control 604 for controlling when to energize motor 606, which is powered by a transformer/rectifier unit 608. Motor control 604 includes a first microprocessor (not shown) for controlling all logics and executing user commands received, among others.

Auxiliary power supply has its own microprocessor, or microcontroller 610, which through battery supply control 612 controls whether to provide DC power from backup battery 614 to motor 606, such as during an AC power failure, or to allow the GDO unit's transformer/rectifier unit 608 to charge the backup battery 614 when there is no AC power failure. As described earlier, current detection circuitry 616 may be used to detect DC power supplied to the DC motor, thus to trigger the micro controller 610 to activate light control 618 to switch on LED light source 620 upon detection of powering of the motor by backup battery 614. This may be detected by detecting the DC power (or DC current) exceeding a threshold value. Light control circuitry 618 can also be used as a countdown timer so the LED light source is switched on only for a pre-set period of time. Alternatively or in addition, a door movement detection device 622, such as a light sensor to detect light path interruption by door movement, may be used to detect movement of the garage door and, upon its detection, to trigger the micro controller 610 to switch on LED light source 620 for a pre-set period of time regardless whether the DC motor is powered by the backup battery 614.

Various examples of an embodiment of the invention have now been described in detail. Those skilled in the art will appreciate that numerous modifications, adaptations and variations may be made to the embodiments without departing from the scope of the invention, which is defined by the appended claims. The scope of the claims should be given the broadest interpretation consistent with the description as a whole and not to be limited to any embodiment set forth in the examples or detailed description thereof.

What is claimed is:

1. A barrier control system for controlling operation of a barrier movement mechanism, the barrier control system comprising:

a microprocessor, said microprocessor receiving user command for operating the barrier movement mechanism, a direct current ("DC") motor for driving the barrier movement mechanism, energizing of the DC motor being controlled by the microprocessor, a light source that can draw DC current directly, an AC-DC converter unit for converting alternating current ("AC") power supply to a first DC power output, the DC motor being powered by said first DC power output, and an auxiliary power supply, said auxiliary power supply providing a second DC power output different from said first DC power output, said second DC power output supplying backup power to the microprocessor, the light source and the DC motor during power failure of said AC power supply, said auxiliary power supply comprising:

a backup battery for supplying the backup power through said second DC power output, and a sensor disposed in a DC path between the backup battery and the DC motor to detect a DC current drawn from the second DC power output by the DC motor, output signal of the sensor being provided as input to the microprocessor, wherein said microprocessor is configured to connect the second DC power output to the light source for a pre-selected duration upon detection of the DC current increasing above a threshold value sufficient to energize the DC motor.

2. The barrier control system of claim 1, wherein the light source comprises one or more light emitting diodes.

3. The barrier control system of claim 1, wherein the light source is built into the auxiliary power supply.

4. The barrier control system of claim 1, wherein switching-on of the light source is separately controllable.

5. The barrier control system of claim 1, wherein the barrier control system is a garage door opener control system and the barrier movement mechanism includes driving mechanism for opening and closing a garage door.

6. The barrier control system of claim 1, wherein the backup battery is electrically connected to the DC power output of the AC-DC converter unit.

7. An auxiliary power supply for a barrier control system, said barrier control system operating on AC power to control operation of a barrier movement mechanism, the barrier control system having a microprocessor, a DC motor controlled by the microprocessor for driving the barrier movement mechanism, and an AC-DC converter unit for converting AC power supply to a first DC power output, the auxiliary power supply comprising:

a backup battery providing a second DC power output different from the first DC power output, the second DC power output providing power to the microprocessor and the DC motor during power failure of the AC power, a second microprocessor powered by the backup battery through the second DC power output during the power failure, and a sensor unit disposed in a DC path between the backup battery and the DC motor to detect a DC current increase supplied to the DC motor through the second DC power output, output signal of the sensor unit being connected to the second microprocessor, wherein said second microprocessor is configured to switch on a light source connected to the second DC power output for a pre-selected duration upon detection of the DC current increasing above a threshold value sufficient to energize the DC motor.

8. The auxiliary power supply of claim 7, wherein the light source comprises one or more light emitting diodes.

9. The auxiliary power supply of claim 7, wherein the light source is built into the auxiliary power supply.

10. The auxiliary power supply of claim 7, wherein the barrier control system is a garage door opener control system and the barrier movement mechanism includes driving mechanism for opening and closing a garage door.

11. The auxiliary power supply of claim 7, wherein the backup battery is electrically connected to the DC power output of the AC-DC converter unit.

* * * * *